US010260352B2

(12) United States Patent
Campbell et al.

(10) Patent No.: US 10,260,352 B2
(45) Date of Patent: Apr. 16, 2019

(54) GAS TURBINE BLADE WITH CORRUGATED TIP WALL

(71) Applicant: Siemens Energy, Inc., Orlando, FL (US)

(72) Inventors: Christian Xavier Campbell, Charlotte, NC (US); Anand A. Kulkarni, Charlotte, NC (US); Daniel M. Eshak, Orlando, FL (US); Allister William James, Chuluota, FL (US); Phillip Behling, Palm Beach Gardens, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 408 days.

(21) Appl. No.: 15/139,379

(22) Filed: Apr. 27, 2016

(65) Prior Publication Data
US 2016/0237827 A1    Aug. 18, 2016

Related U.S. Application Data

(63) Continuation-in-part of application No. 14/330,226, filed on Jul. 14, 2014, now abandoned, which is a
(Continued)

(51) Int. Cl.
*F01D 5/14*    (2006.01)
*B23K 26/342*    (2014.01)
(Continued)

(52) U.S. Cl.
CPC .............. *F01D 5/147* (2013.01); *B22D 19/10* (2013.01); *B22F 3/1055* (2013.01); *B22F 5/04* (2013.01);
(Continued)

(58) Field of Classification Search
CPC . F01D 5/147; F01D 5/005; F01D 5/20; B23P 15/04; B22D 19/10; B23K 26/342;
(Continued)

(56) References Cited

U.S. PATENT DOCUMENTS 5,626,462 A    5/1997    Jackson et al.
5,820,337 A    10/1998    Jackson et al.
(Continued)

FOREIGN PATENT DOCUMENTS

EP    2182168 A1    5/2010
WO    WO2014105109    7/2014
(Continued)

OTHER PUBLICATIONS

PCT International Search Report and Written Opinion of International Searching Authority dated Oct. 13, 2017 corresponding to PCT International Application No. PCT/US2017/026484 filed Apr. 7, 2017.

*Primary Examiner* — Ryan J. Walters

(57) ABSTRACT

A gas turbine engine blade (10), including a base portion (12) having a cast wall, and a tip portion (14) attached to the base portion and having a wall (60) formed by an additive manufacturing process. The tip portion wall may be formed to be solid and less than 2 mm in thickness, or it may be corrugated and be greater than 2 mm in thickness. Openings (80) defining the wall corrugations may be semi-circular, rectangular, trapezoidal, or elliptical in cross-sectional shape. The resulting blade has lower tip mass while retaining adequate mechanical properties. The tip portion may be formed to have a directionally solidified grain structure on a base portion having an equiaxed grain structure.

5 Claims, 6 Drawing Sheets

Related U.S. Application Data continuation-in-part of application No. 13/956,635, filed on Aug. 1, 2013, now abandoned.

(51) Int. Cl.

| | | |
|---|---|---|
| *B22F 3/105* | (2006.01) | |
| *B22F 5/04* | (2006.01) | |
| *B22D 19/10* | (2006.01) | |
| *F01D 5/00* | (2006.01) | |
| *B23P 15/04* | (2006.01) | |
| *B33Y 10/00* | (2015.01) | |
| *B33Y 80/00* | (2015.01) | |
| *F01D 5/20* | (2006.01) | |
| *B22F 7/06* | (2006.01) | |
| *B23K 101/00* | (2006.01) | |

(52) U.S. Cl.
CPC ............ *B23K 26/342* (2015.10); *B23P 15/04* (2013.01); *F01D 5/005* (2013.01); *B22F 2003/1058* (2013.01); *B22F 2007/068* (2013.01); *B23K 2101/001* (2018.08); *B33Y 10/00* (2014.12); *B33Y 80/00* (2014.12); *F01D 5/20* (2013.01); *F05D 2220/32* (2013.01); *F05D 2230/21* (2013.01); *F05D 2230/22* (2013.01); *F05D 2240/307* (2013.01); *F05D 2250/12* (2013.01); *F05D 2250/13* (2013.01); *F05D 2250/14* (2013.01); *Y02P 10/295* (2015.11)

(58) Field of Classification Search
CPC .... B23K 2101/001; B22F 5/04; B22F 3/1055; B22F 2003/1058; B22F 2007/068; B33Y 10/00; B33Y 80/00; F05D 2230/22; F05D 2220/32; F05D 2250/14; F05D 2250/12; F05D 2240/307; F05D 2230/21; F05D 2250/13

See application file for complete search history.

(56) References Cited

U.S. PATENT DOCUMENTS

| | | | |
|---|---|---|---|
| 6,837,687 B2 | 1/2005 | Lee et al. | |
| 7,568,887 B1 | 8/2009 | Liang | |
| 8,079,821 B2 | 12/2011 | Campbell et al. | |
| 8,215,181 B1 | 7/2012 | Helmink | |
| 8,506,836 B2* | 8/2013 | Szuromi | B22F 3/1055 |
| | | | 216/102 |
| 8,535,004 B2 | 9/2013 | Campbell | |
| 8,720,526 B1 | 5/2014 | Campbell et al. | |
| 8,979,498 B2 | 3/2015 | Mazzola et al. | |
| 2010/0284798 A1 | 11/2010 | Campbell et al. | |
| 2011/0236221 A1 | 9/2011 | Campbell | |
| 2014/0099476 A1 | 4/2014 | Subramaniam et al. | |
| 2015/0034266 A1 | 2/2015 | Bruck et al. | |
| 2015/0224607 A1 | 8/2015 | Bruck et al. | |
| 2015/0275687 A1 | 10/2015 | Bruck et al. | |
| 2018/0023395 A1* | 1/2018 | Jones | F01D 5/141 |
| | | | 416/95 |
| 2018/0023403 A1* | 1/2018 | Jones | F01D 5/141 |
| | | | 415/115 |

FOREIGN PATENT DOCUMENTS

| | | |
|---|---|---|
| WO | WO2014105113 | 7/2014 |
| WO | 2016028543 A1 | 2/2016 |

* cited by examiner

GAS TURBINE BLADE WITH CORRUGATED TIP WALL

This application is a continuation-in-part of U.S. patent application Ser. No. 14/330,226, filed 14 Jul. 2014, and published as United States Patent Application Publication No. US 2015/0034266 A1, which is incorporated by reference herein. That application, in turn, is a continuation-in-part of U.S. patent application Ser. No. 13/956,635, filed 1 Aug. 2013, and published as United States Patent Application Publication No. US 2015/0033559 A1, which is incorporated by reference herein.

FIELD OF THE INVENTION

This invention relates generally to the fields of metals joining and additive manufacturing and, more particularly, to a process for manufacturing a component by casting a substrate and then depositing metal onto the previously-cast substrate using an additive manufacturing process to complete the component.

BACKGROUND OF THE INVENTION

Gas turbine engine generating capacities continue to increase, and combined cycle output for a single engine now exceeds 500 MW. Higher power output machines tend to be physically larger, and one power limiting characteristic is the size of the last row of the rotating turbine blades, since the centrifugal force generated in such long blades can exceed the material strength capability of known alloys.

Several techniques have been developed to reduce the weight of turbine blades, thereby facilitating the design of ever larger machines. U.S. Pat. No. 5,626,462 to Jackson et al. discloses a double walled airfoil where an outer skin is metallurgically bonded to an inner support wall. The double wall contains integral cooling channels. However, the bonding of the outer skin and the inner support wall and sharp corners created at the bonds allow for stress risers that may affect component life. U.S. Pat. No. 8,079,821 to Campbell et al. discloses inner and outer walls connected by a compliant structure to enable thermal expansion between the inner and outer layers. However, this arrangement may require complex manufacturing steps to secure the compliant members to the inner and outer walls. U.S. Pat. No. 8,720,526 to Campbell et al. discloses a process for forming a long gas turbine engine blade having a main wall with a thin portion near a tip. In Campbell, a blade is cast having a tip that is thicker than desired. The tip is subsequently machined to the desired size, which adds cost to the manufacturing process. U.S. Pat. No. 8,979,498 to Mazzola et al. discloses creating an airfoil by attaching a cast tip to a cast base via metallurgical bonding or fasteners. However, because it is cast, the tip is limited to characteristics achievable via the casting process.

As the next generation of even larger gas turbine engines is demanded in the marketplace, further improvements in blade design and fabrication will be required.

BRIEF DESCRIPTION OF DRAWINGS

The invention is explained in the following description in view of the drawings that show.

DETAILED DESCRIPTION OF THE INVENTION

Figure 1:
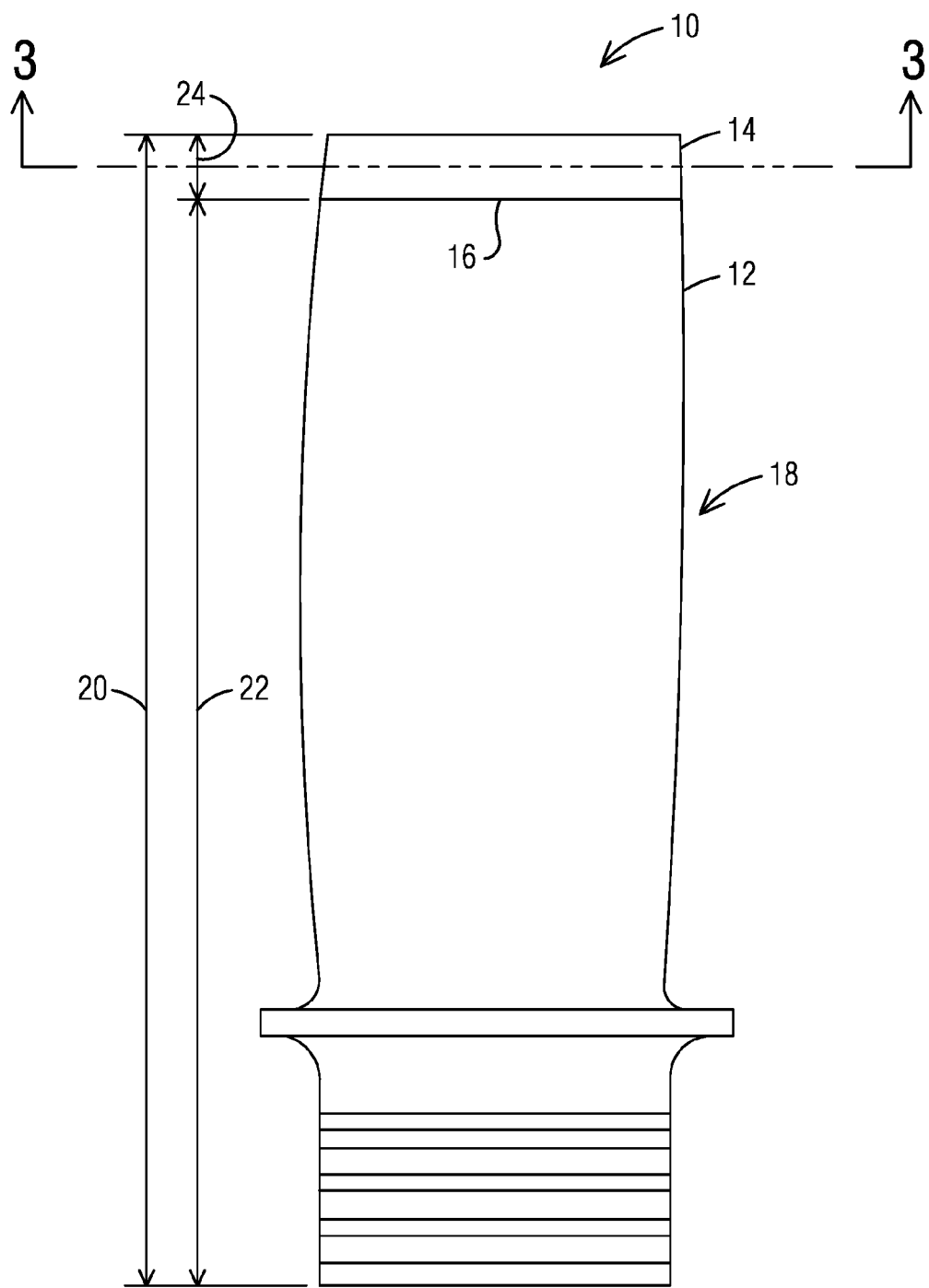
FIG. 1 shows a blade for a gas turbine engine having a cast base portion and a tip portion formed on the cast base portion by an additive manufacturing process.

Current gas turbine engine operating conditions expose turbine blades to various forces, including those associated with rotation. Mass at a tip of the blade requires structural support below the tip to support the pull of the mass at the tip during rotation. The structural support adds to the overall mass of the blade, resulting in a blade that is much more massive than desired. For this reason it is important to form the blade walls as thin as possible. Casting is the conventional method by which blades are formed. However, it is difficult to cast thin walled airfoils, particularly in very large turbine blades, because conventional casting is limited to walls having a thickness of at least about two (2) millimeters, and even this can be a challenge. To achieve longer blades than what is achievable today, it is desirable to reduce the mass at the tip to less than the mass present in those two (2) millimeter thick walls.

The Inventors have devised an innovative method for manufacturing a turbine blade that allows for reduced mass at the blade tip. This allows for the manufacture and use of longer turbine blades which increases engine efficiency. The proposed method combines casting and additive manufacturing in a novel way to manufacture the blade. Specifically, the base of the blade is cast using conventional techniques, but without a tip portion. Base portion material may be any known to be suitable for a turbine blade, including a superalloy. The tip portion is subsequently formed on the base portion through an additive manufacturing process. Tip portion material may be any known to be suitable for a turbine blade, including a superalloy. The tip portion material may be the same as the base portion material or the tip portion material may be different than the base portion material. For example, the tip portion material may be selected based on design requirements local to the blade tip, such as abradability etc.

Additive manufacturing processes such as the laser powder deposition process discussed in the parent application US 2015/0034266 A1, provide much greater control and therefore are capable of forming walls having a thickness down to approximately 0.5 millimeters. This enables at least two options for forming the blade tip portion. In a first embodiment, the wall in the tip portion may simply be formed as a solid wall having a thickness less than two (2) millimeters by using an additive manufacturing process. In a second embodiment, the wall in the tip portion may be formed as a corrugated wall (e.g. an engineered wall), and the corrugated wall will have less mass for any given thickness than would a cast/solid wall, while retaining comparable or greater structural strength and stability.

For example, while a solid wall in the tip portion having a thickness of one (1) millimeter may reduce rotational forces on a remainder of the blade sufficiently, it is unclear if the one (1) millimeter thick wall could withstand other stressors (e.g. pressure forces and cycle fatigue). However, a two (2) millimeter thick corrugated wall in the tip portion would have an acceptable mass and, by nature of the engineered structure, it would also have acceptable structural strength, improved stiffness, and be better able to withstand the other stressors. The present invention utilizes an additive manufacturing process to form the tip portion of a blade onto a cast base portion, and it allows for forming the tip portion to have either a solid (such as less than 2 mm) or corrugated type of wall (such as at least 2 mm), or even the formation of a tip portion having a hybrid wall where both solid and engineered sections are present.

Casting a base portion of a blade without the tip can be significantly less expensive than casting the full blade for long blades approaching the limits of the casting process. The reduced length improves core stiffness and facilitates core positioning. Still further, the reduced mass can help with solidification and can mitigate shell bulging and other mass related casting challenges. Thus, yield may be improved when casting a blade without a tip. These savings counterbalance the cost of a separate additive manufacturing step. Moreover, the present invention enables the production of blades having greater lengths than can be achieved with known techniques.

FIG. 1 shows an exemplary embodiment of a blade 10 having a base portion 12 metallurgically bonded to a tip portion 14 at an interface 16. The base portion 12 may be formed via a conventional casting operation and the tip portion 14 may be subsequently formed on the base portion by an additive manufacturing process. Those of ordinary skill in the art would recognize that acceptable additive manufacturing techniques include but are not limited to selective laser melting (SLM) and selective laser sintering (SLS), and the like.

The blade 10 includes an airfoil portion 18 and has a total blade radial length 20. The total blade radial length 20 includes a base portion radial length 22 and a tip portion radial length 24. While it is known to perform repairs on the wear surface at the tip of a blade (squealer tip) using an additive manufacturing process, the present invention utilizes an additive manufacturing process for the original fabrication of an entire tip portion 14 of the blade including at least some of the airfoil portion 18. In exemplary embodiments, the tip portion radial length 24 may be within 5-40% of the total blade radial length 20. A balance is selected for each particular blade design between the relatively lower cost of the cast base portion 12 and the relatively higher cost but lighter tip portion 14. In an exemplary embodiment the total blade radial length 20 may be 870 mm and the tip portion radial length 24 may be 87 mm or more. In an exemplary embodiment the base portion 12 is hollow and a wall thickness (not shown) of the base portion 12 may be two millimeters or more, which will provide a sufficient substrate base upon which to start the additive manufacturing process. The cast wall may or may not include openings such as cooling channels etc.

Figure 2:
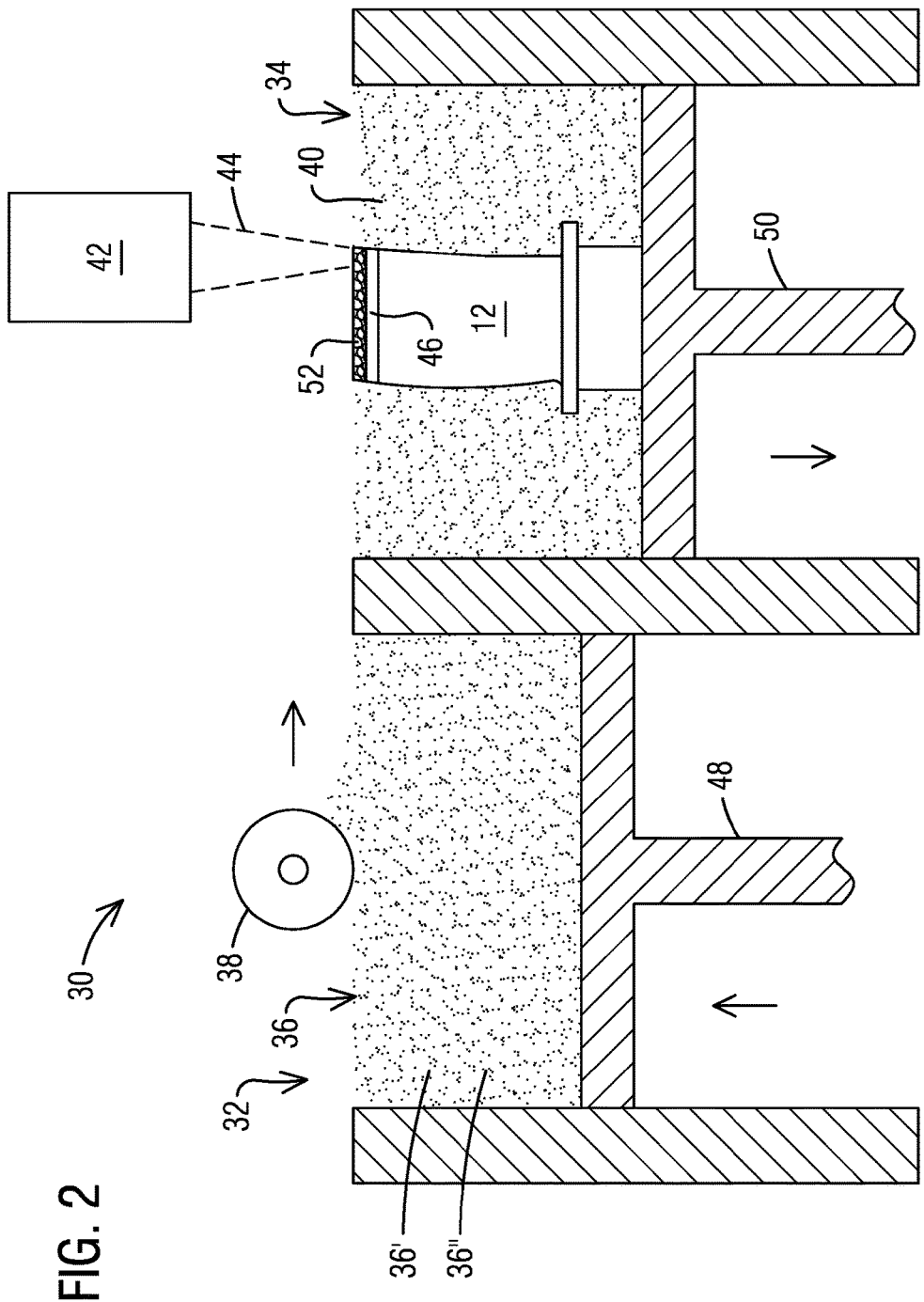
FIG. 2 is a schematic illustration of an additive manufacturing process in accordance with an embodiment of the invention.

FIG. 2 illustrates an additive manufacturing process such as selective laser sintering or selective laser melting, collectively referred to herein as selective laser heating, in accordance with an embodiment of the invention and used to form the tip portion 14 on the base portion 12. An additive manufacturing apparatus 30 includes a powder feed portion 32 and a fabrication portion 34. The powder feed portion 32 contains a volume of powder 36 which is selectively moved to the fabrication portion 34 by a powder feed and distribution device such as roller 38, which delivers a predetermined thickness of unprocessed powder 36 across the top surface of a fabrication powder bed 40 of the fabrication portion 34. A scanning system 42 then selectively scans an energy beam such as laser beam 44 in a programmed pattern across portions of the surface of the fabrication powder bed 40 to selectively heat (melt, partially melt or sinter) and solidify a region of the powder and thereby form a deposit layer 46 on the base portion 12. In some SLS and SLM techniques a delivery piston 48 then moves upward to make additional powder 36 available to the roller 38, a fabrication piston 50 moves downward to allow the fabrication powder bed 40 to receive another layer of powder 36, and the process is repeated with a pattern of indexing of the laser beam 44 effective to form a desired shape of the tip portion 14.

With prior art selective laser heating processes involving superalloy materials, powdered superalloy material is heated under an inert cover gas in order to protect the melted or partially melted powder 36 from contact with air. In contrast, the embodiment of the present invention illustrated in FIG. 2 utilizes powdered superalloy material 36' plus powdered flux 36" as the powder 36, and thus the heating need not be (although it may optionally be) performed under an inert cover gas because melted flux provides the necessary shielding from air. The powder 36 may be a mixture of the powdered superalloy material 36' and powdered flux 36", or it may be composite particles of alloy and flux, as described above. In order to enhance the precision of the process, the powder 36 may be of a fine mesh, for example 20 to 100 microns, and the mesh size range of particles of the powdered flux 36" may overlap or be the same as the mesh size range of particles of the powdered superalloy material 36'. The powdered flux 36" functions as a light trap to assist in the absorption of laser energy, and the resulting slag 52 slows the cooling rate and contains process energy. The powdered flux 36" may be formulated to contribute to the deposit chemistry in some embodiments. While not required, it may be advantageous to heat the powder 36 and/or the base portion 12 prior to a heating step. Post process hot isostatic pressing is also not required by may be used in some embodiments. Post weld heat treatment of the completed blade 10 may be performed with a low risk of reheat cracking even for difficult to weld superalloys.

Figure 3:
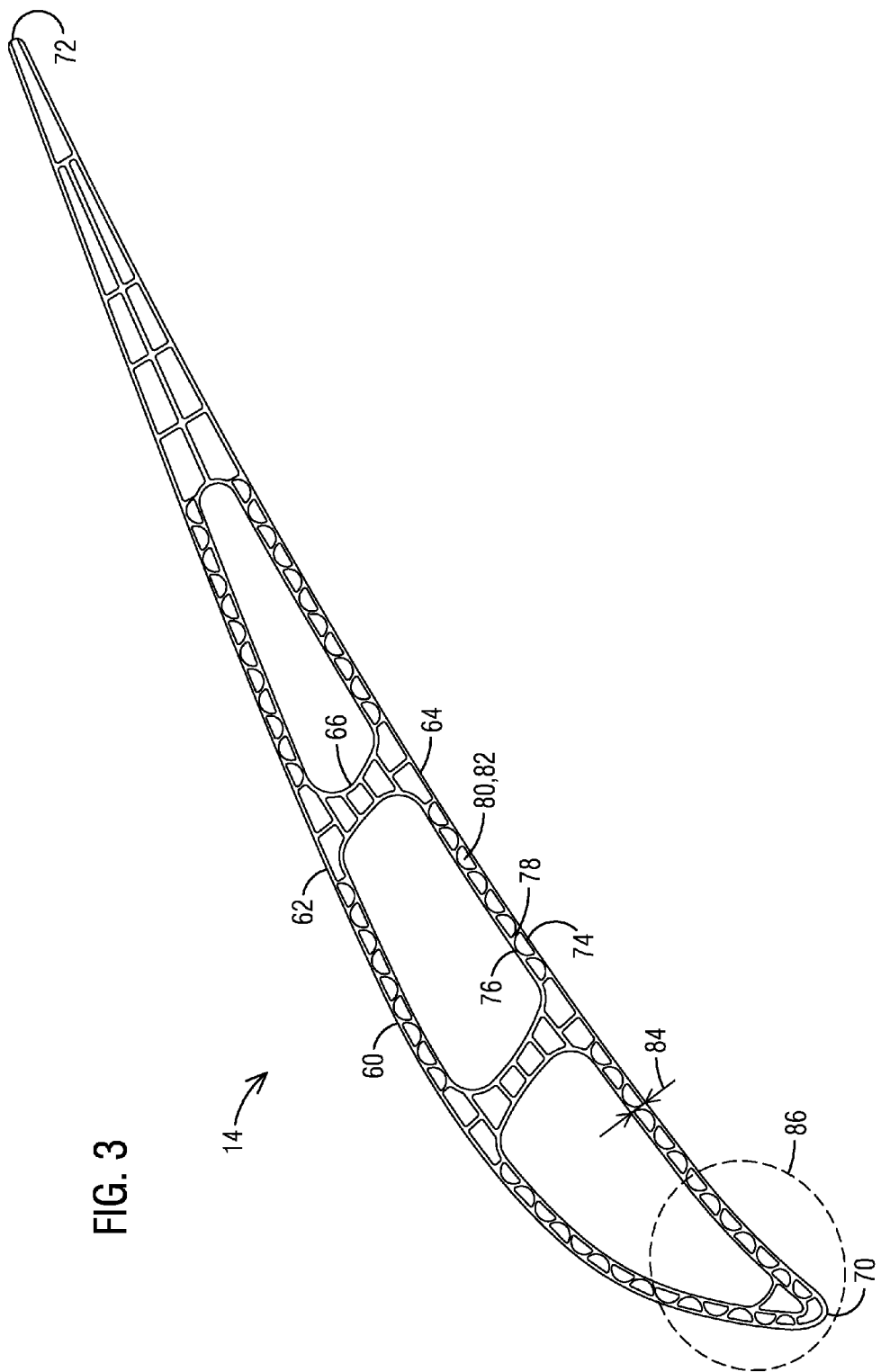
FIG. 3 shows a cross section of an exemplary embodiment of the tip portion of the blade of FIG. 1 along section 3-3 of FIG. 1.

FIG. 3 shows a cross section of an exemplary embodiment of the tip portion 14 along line 3-3 of FIG. 1. The tip portion includes a corrugated wall 60 having a suction side 62, a pressure side 64, and a corrugated rib 66 spanning there between. The suction side 62 and the pressure side 64 each span from a leading edge 70 to a trailing edge 72. As used herein, a corrugated structure (e.g. a wall or rib) means a structure having an outer panel 74, an inner panel 76, and integral connections 78 spanning from the outer panel 74 to the inner panel 76. The integral connections 78 define openings 80 between the outer panel 74 and the inner panel 76, and the openings 80 may optionally define cooling channels 82. In the embodiment shown, the corrugated wall 60 is characterized by a thickness 84 that may be approximately two (2) millimeters. The outer panel 74, the inner panel 76, and the integral connections 78 each may be characterized by a thickness as low as 0.5 millimeters, depending upon the limits of the additive manufacturing process.

Figure 4:
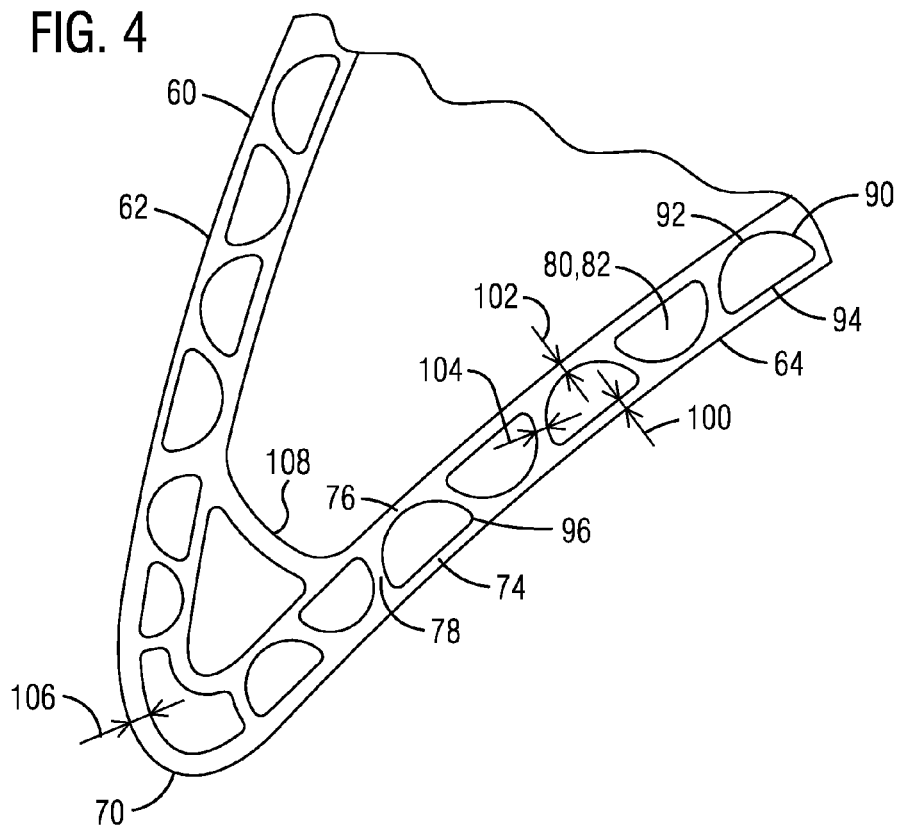
FIGS. 4-7 show in cross-section exemplary embodiments of a leading edge region of the tip portion for alternative embodiments of the blade of FIG. 1.

The integral connections 78 may define openings 80 having any cross sectional shape desired. FIGS. 4-7 show close ups of exemplary alternative embodiments of a leading edge region of the blade of FIG. 1. FIG. 4 shows an exemplary embodiment where the openings 80 are characterized in cross section by a semi-circular shape 90 having a curved side 92 and a flat side 94. In this exemplary embodiment, an orientation of the semi-circular shape 90 alternates from the leading edge 70 to the trailing edge 72. This configuration yields integral connections 78 that are angled with respect to the outer panel 74 and the inner panel 76. This provides a stiffness benefit while fillets 96 formed at respective interfaces reduce stress risers. An outer panel thickness 100, an inner panel thickness 102, and an integral connection thickness 104 may be as little as 0.5 millimeters and may remain constant or may vary locally as necessary.

For example, an outer panel leading edge thickness 106 may be approximately one (1) millimeter while the outer panel thickness 100 is 0.5 millimeters elsewhere. This type of local tailoring of the dimensions and shape of the corrugated wall 60 is made possible through the proposed use of the additive manufacturing process. Also visible is a non-corrugated rib 108 spanning the outer panel 74 and the inner panel 76. Corrugated ribs 66, non-corrugated ribs 108, or a combination of both may be used in a given tip portion 14 as desired. Corrugated ribs 66 may include the openings 80 in the shapes disclosed as well as any desired shape.

Figure 5:
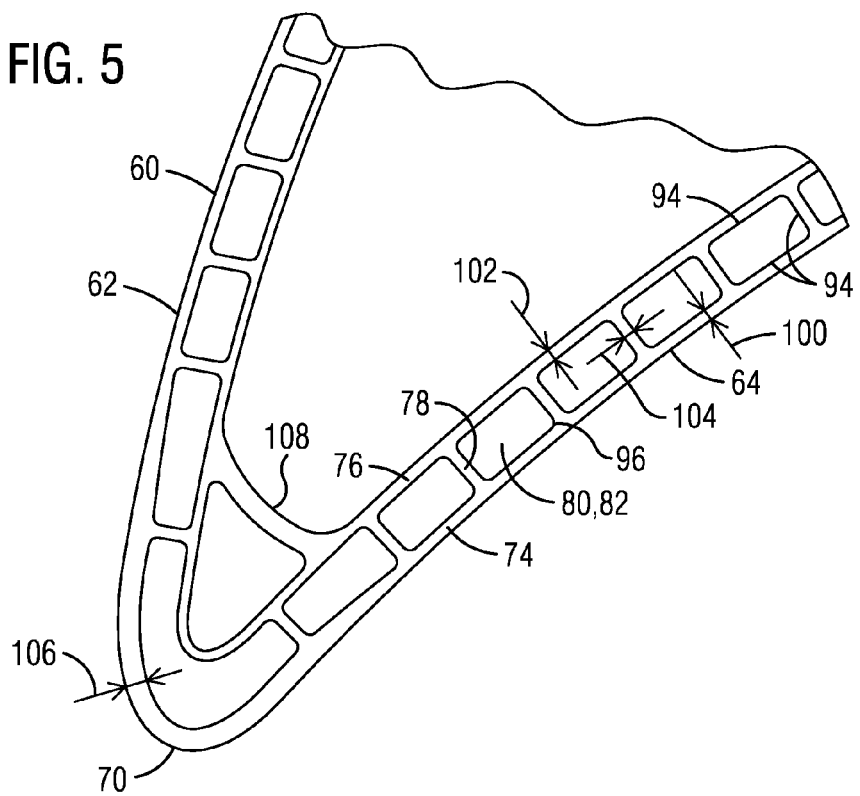
Figure 6:
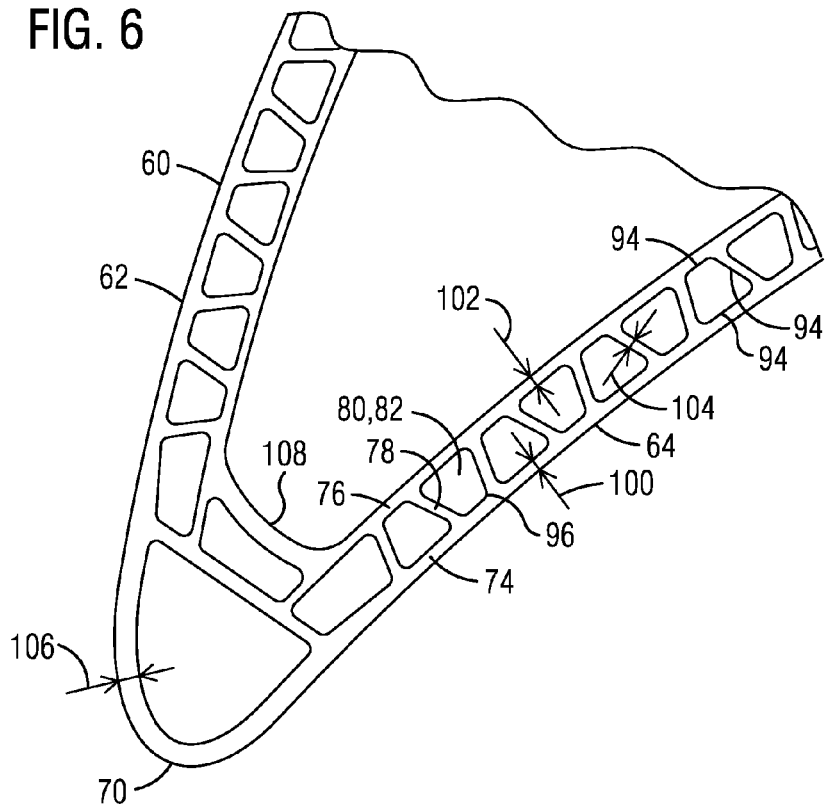
Figure 7:
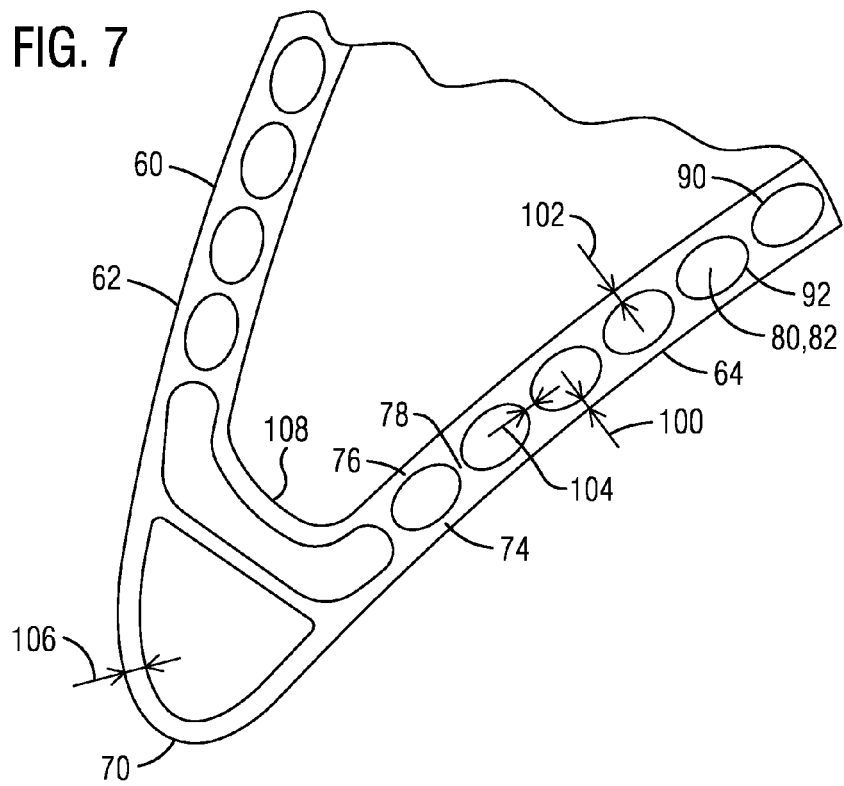

FIGS. 5-7 show alternate cross sectional shapes of the openings 80 that may be formed by the integral connections 78. FIG. 5 shows rectangular shapes having rounded corners, and FIG. 6 shows trapezoidal shapes also having rounded corners. FIG. 7 shows elliptical openings. Any cross section desired may readily be formed when using the additive manufacturing process as proposed, and a single blade may include different wall corrugation designs in different regions of the blade, as well as walls that include both solid and corrugated portions along a given cross-section. A corrugated wall when viewed in cross-section as shown in FIGS. 3-7 may typically include a void/solid area ratio of 55-75%.

The tip portion 14 of the blade 10 may be formed to have a different material composition than the base portion 12. For example, an alloy developed by The International Nickel Company, Inc., described in U.S. Pat. No. 3,061,426 and known as IN-100, is known to have a desirably lower density/strength ratio and could be useful for gas turbine blade applications. However, that alloy is difficult to cast and is subject to hot tearing when cast in the shape of a large blade. Because hot tearing can be controlled when depositing IN-100 via an additive manufacturing method, the present invention facilitates the use of that relatively lighter material for the tip portion 14 of the blade 10 while using a more easily cast but denser material for the base portion 12, such as CM-247 alloy. Because the centrifugal force effect is more pronounced for mass located at the tip of the blade, the present invention enables a blade designer to capture much of the benefit of the use of IN-100 material while mitigating its disadvantages.

Moreover, the tip portion 14 of the blade 10 may be formed to have a different grain structure than the base portion 12. For example, a directionally solidified (DS) tip portion 14 may be formed on a conventionally cast (CC) base portion 12. By controlling the heat flow direction during an additive manufacturing process, directionally solidified grains of material can be produced. If the substrate layer of the base portion 12 is conventionally cast and contains an equiaxed grain structure, it may be useful to first deposit one or more relatively thicker cladding layers (for example 2 mm laser cladding layer) to encourage the initiation of directionally solidified (vertically oriented) grains. Subsequent layers may then be much thinner (for example 0.5 mm selective laser melted layers) to form the desired geometry of the tip portion 14.

Figure 8:
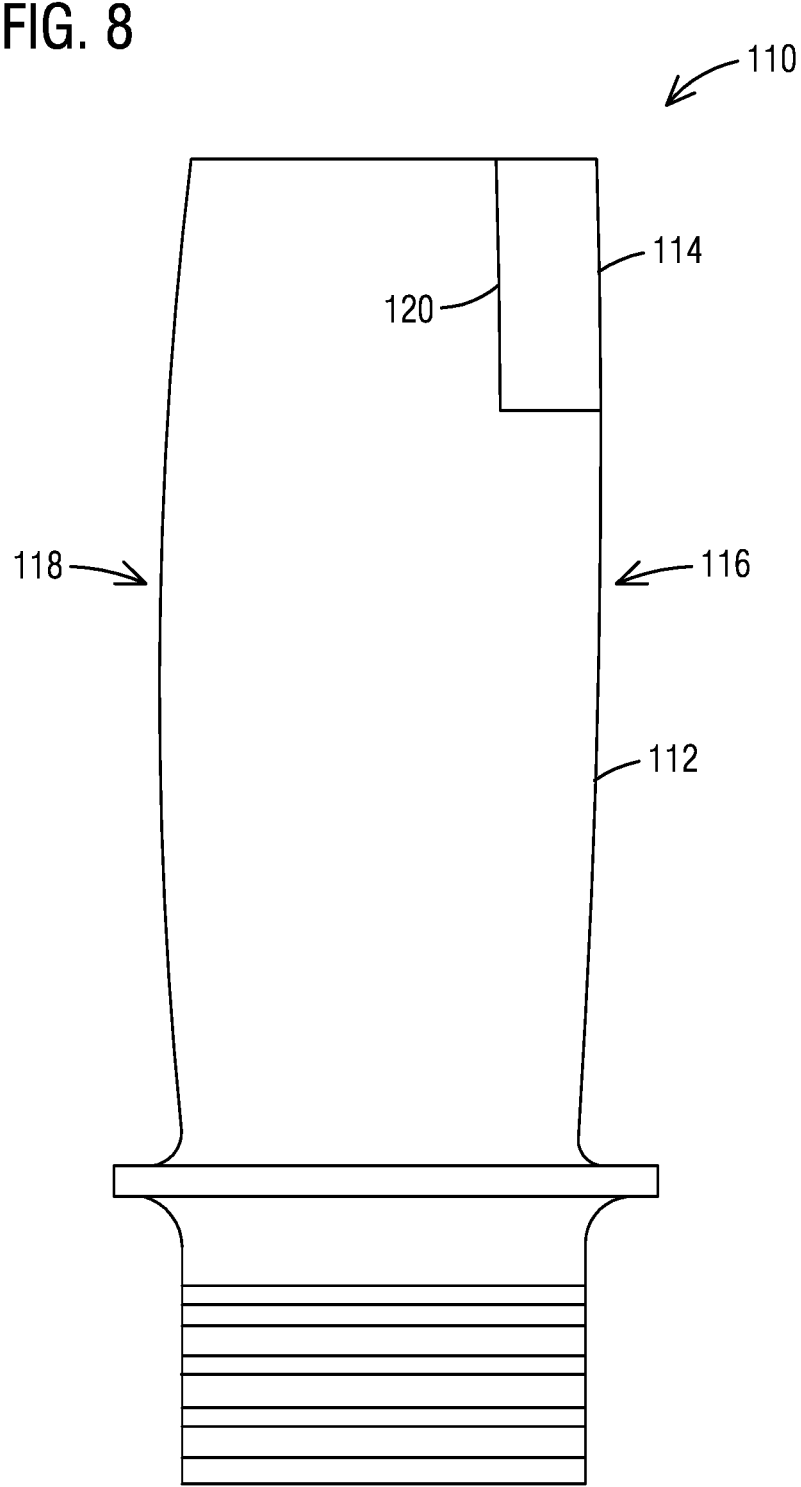
FIG. 8 illustrates an embodiment of the invention having a cast base portion and a trailing edge portion formed by an additive manufacturing process.

FIG. 8 illustrates a gas turbine engine blade 110 having a base portion 112 formed by a traditional casting process and a tip portion 114 formed by an additive manufacturing process. In this embodiment, the tip portion 114 extends only proximate a trailing edge 116 of the blade 110, while the leading edge 118 of the blade 110 is fully within the base portion 112. The trailing edge tip region is often the most highly thermally stressed region of a gas turbine blade. The present invention allows that region to be specially designed in response to such conditions, such as by being formed of a different material than the base portion 112 and/or by incorporating a unique cooling passageway geometry that may not be possible using conventional casting techniques. The interface 120 between the cast base portion 112 and the additively manufactured portion 114 may be defined by the blade designer to optimize the advantages of both the casting and additive manufacturing processes. For example, the radial length of the tip portion 114 may extend in the range of 10-90% of the total radial length of the airfoil portion of the blade 110 (e.g. radial length of leading edge 118). Moreover, more than one region of the blade may be formed by additive manufacturing processes.

In light of the foregoing it can be seen that the proposed method simplifies and decreases the cost of the casting step while permitting better control of the tip portion. The result is a turbine blade that is easy to manufacture, has higher yield, and increases turbine engine efficiency. Therefore, it represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of manufacturing a gas turbine engine blade, the method comprising forming a tip portion of the blade on a cast base portion of the blade by an additive manufacturing process,
   forming the tip portion to comprise a corrugated wall by the additive manufacturing process,
   wherein the corrugated wall comprises an inner panel, an outer panel, and integral connections there between, and forming the inner panel and the outer panel such that each comprises a cross-sectional thickness that is not greater than 0.5 millimeter in at least one respective location; and
   forming the corrugated wall to comprise a plurality of openings having semi-circular shapes when viewed in cross-section and disposed in a direction from a leading edge of the corrugated wall to a trailing edge of the corrugated wall along a length of the wall, adjacent semi-circular shapes having alternate orientations.

2. The method of claim 1, wherein the cast base portion comprises a conventionally cast equiaxed grain structure, and further comprising forming the tip portion to comprise a directionally solidified grain structure.

3. The method of claim 1, further comprising forming the tip portion to comprise a cross-sectional wall thickness that is different at two locations along a wall of the blade.

4. The method of claim 1, further comprising forming the tip portion to comprise a corrugated structural rib by the additive manufacturing process.

5. The method of claim 1, further comprising forming the tip portion such that a radial length of the tip portion is 5-40% of a total radial length of the blade.

\* \* \* \* \*